UNITED STATES PATENT OFFICE.

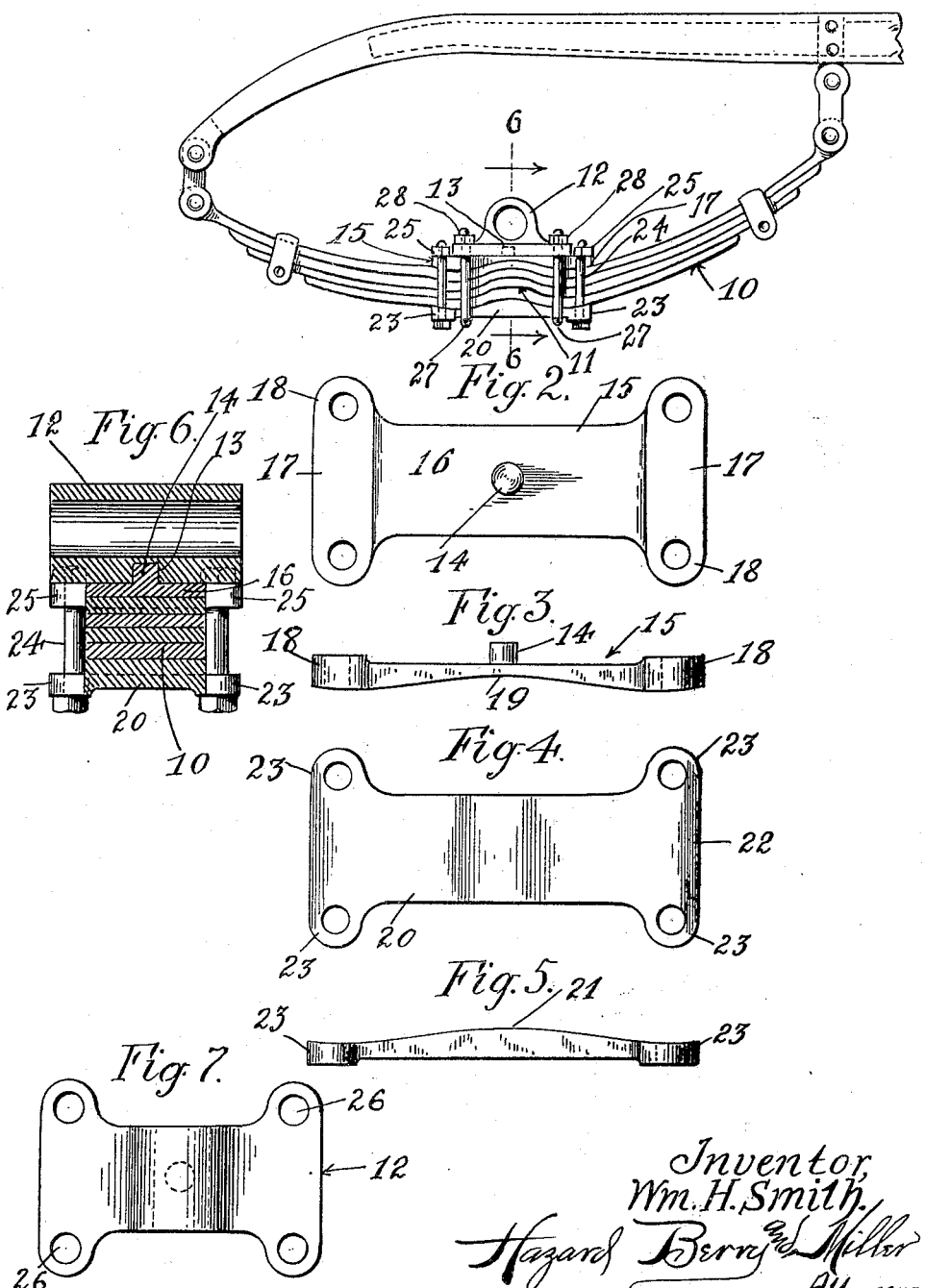

WILLIAM H. SMITH, OF LOS ANGELES, CALIFORNIA.

VEHICLE-SPRING.

1,203,150.  Specification of Letters Patent.  Patented Oct. 31, 1916.

Application filed November 29, 1915. Serial No. 63,966.

*To all whom it may concern:*

Be it known that I, WILLIAM H. SMITH, a citizen of the United States, residing at Los Angeles, in the county of Los Angeles and State of California, have invented new and useful Improvements in Vehicle-Springs, of which the following is a specification.

My invention relates to vehicle springs and in particular to a vehicle spring clip by which an underslung spring is attached to an axle block.

It is an object of this invention to provide a novel spring clip for an under-slung spring and to construct the clip in such a way that the lugs or ears thereof are positioned at the ends in order to clear attachments on the axle, such as brakes and the like.

It is another object of my invention to provide novel means for securing the yoke bolts of the clip in relation to tie bolts which hold the plates of the clip together.

With these and other objects in view which will appear as the description proceeds, my invention consists in the construction and arrangement of parts hereinafter described and claimed.

In the accompanying drawings which form a part of this specification: Figure 1 is a side elevation of the under-slung spring provided with my new clip, showing its attachment to the frame of the vehicle. Fig. 2 is a top plan view of the top clip plate. Fig. 3 is a side elevation thereof. Fig. 4 is a top plan view of the bottom plate. Fig. 5 is a side elevation thereof. Fig. 6 is a vertical cross section taken on the plane indicated by the line 6—6 of Fig. 1. Fig. 7 is a top plan view of the axle block.

10 represents a laminated leaf spring of the general elliptical type, whose central portion is curved upwardly as at 11.

12 represents an axle block which is provided with a flat bearing face on its lower side. This bearing face has the general shape of a rectangle and is provided at its center with a cylindrical socket 13 in which a cylindrical pin 14 of the top plate 15 is positioned. The top plate has a central body portion 16 of a size and shape corresponding to the bearing face of the axle block. The end portions 17—17 of the top plate project beyond the ends of the axle block and are each provided with a pair of lateral apertured ears or lugs 18. The upper face of the top plate is flat but the lower face is concave in the middle, as at 19. A bottom clip plate 20 of a size corresponding to the size of the top plate is provided with a convex upper face 21. The curvature of the concave lower face of the top plate and the convex upper face of the bottom plate correspond to the curvature of the central portion of the leaf spring. The width of the leaf spring corresponds to the width of the axle block and the clip plates.

The end portions 22 of the lower clip plate are provided with a pair of apertured ears or lugs 23. Tie bolts 24, provided with nuts 25 passing through the apertured ears of the clip plates and in closed relation to the leaf spring, hold the spring securely in position. The axle block 12 is provided at each of its end portions with a pair of lateral apertured lugs 26. A pair of U-shaped yoke bolts 27 encircle the lower clip plate about the ends of its central portion and at the inner sides of the lugs 23, and pass through the apertured ears of the axle block 12 to which they are secured by means of nuts 28. The yoke bolts are in close and parallel relation to the tie bolts 24.

It will be evident from the foregoing description that the leaf spring is securely held in position, being prevented from longitudinal movement by the curved top and bottom plates of the clip and from lateral movement by the tie and yoke bolts. It should be noted that no bolt passes through the spring itself, whereby the strength of the spring is unimpaired. By making the clip plates longer than the axle block, I secure an exceptionally long bearing for the central portion of the spring, thereby minimizing the danger of fracture which, in ordinary springs, is liable to occur at the ends of the clip plates.

I claim:

1. In an under-slung vehicle spring the combination of an axle block having a flat rectangular bearing face on its lower side, said face having a central socket, a spring securing clip, said clip comprising an upper plate having a concave under face and a central pin on its upper face positioned in said socket, a lower plate having a convex upper face, a laminated leaf spring curved in the central portion thereof and fitting between the curved faces of said plates, said plates projecting beyond the ends of said axle block and provided with lateral apertured ears at their ends, tie bolts passing through said ears and holding said plates securely in position, and a pair of yoke bolts fitting over said lower plate at the inner sides of said ears, the threaded ends of said yoke bolts passing through apertures in said axle block and held in rigid engagement by nuts.

2. In an under-slung vehicle spring the combination of an axle block having a flat bearing face on its under side, said face having a socket, a spring-holding clip, said clip comprising an upper plate having a concave under face and a pin on its upper face positioned in said socket, a lower plate having a convex upper face, a leaf spring curved in its central portion thereof and fitting between the curved faces of said plates, said plates being provided with lateral apertured ears at their ends, tie bolts passing therethrough and holding said plates securely in position, and a pair of yoke bolts fitting over said lower plate at the inner sides of said ears, the threaded ends of said bolts passing through apertures in said axle block and held in rigid engagement by nuts.

3. In an under-slung vehicle spring the combination of an axle block having a flat bearing face on its under side, a spring-holding clip, said clip comprising an upper plate having a concave under face and means on its upper face coacting with said axle block for preventing movement of said plate in relation to said axle block, a lower plate having a convex upper face, a leaf spring curved in its central portion thereof and fitting between the curved faces of said plates, said plates being provided with lateral apertured ears at their ends, tie bolts passing therethrough and holding said plates securely in position, and a pair of yoke bolts fitting over said lower plate at the inner sides of said ears, the threaded ends of said bolts passing through apertures in said axle block and held in rigid engagement by nuts.

In testimony whereof I have signed my name to this specification.

WILLIAM H. SMITH.

Copies of this patent may be obtained for five cents each, by addressing the "Commissioner of Patents, Washington, D. C."